United States Patent [19]
Sonnendorfer et al.

[11] Patent Number: 5,951,029
[45] Date of Patent: Sep. 14, 1999

[54] TRANSPORT CART WITH DEPOSIT LOCK

[75] Inventors: Horst Sonnendorfer; Franz Wieth, both of Puchheim, Germany

[73] Assignee: SYSTEC Ausbausysteme GmbH, Puchheim, Germany

[21] Appl. No.: 08/800,152

[22] Filed: Feb. 13, 1997

[30] Foreign Application Priority Data

Feb. 16, 1996 [DE] Germany ................ 196 05 805

[51] Int. Cl.⁶ .................. B62D 39/00; G07F 7/00
[52] U.S. Cl. ................ 280/33.992; 280/33.994; 194/212; 194/905
[58] Field of Search ............ 280/33.991, 33.994, 280/33.992; 194/212, 213, 905

[56] References Cited

U.S. PATENT DOCUMENTS

| 5,131,517 | 7/1992 | Di Paolo et al. ............ 194/257 |
| 5,220,987 | 6/1993 | Di Paolo et al. ............ 194/212 |
| 5,236,073 | 8/1993 | Di Paolo et al. ............ 194/212 |
| 5,328,013 | 7/1994 | Fuchs ........................ 194/213 |
| 5,427,392 | 6/1995 | Duer . |
| 5,773,954 | 6/1998 | Van Horn ..................... 320/2 |

FOREIGN PATENT DOCUMENTS

| 05 18 094 A1 | 12/1992 | European Pat. Off. . |
| 35 15 069 A1 | 11/1986 | Germany . |
| 38 35 584 A1 | 1/1990 | Germany . |
| 89 12 519 U1 | 3/1990 | Germany . |
| 37 14 115 C2 | 10/1990 | Germany . |
| 42 06 606 A1 | 9/1993 | Germany . |
| 42 30 361 A1 | 3/1994 | Germany . |
| 42 35 473 A1 | 4/1994 | Germany . |
| 93 18 485 U1 | 4/1994 | Germany . |
| 93 13 499 U1 | 6/1994 | Germany . |
| 43 20 932 A1 | 1/1995 | Germany . |

*Primary Examiner*—Peter C. English
*Assistant Examiner*—Bridget Avery
*Attorney, Agent, or Firm*—Panitch Schwarze Jacobs & Nadel, P.C.

[57] ABSTRACT

A transport cart which can be stacked in a column with other carts is equipped with a deposit lock for uncoupling it in return for a deposit token and for coupling it up again in exchange for returning the deposit token. For moving the cart, it is provided at its rear end with a handle bar extending transversely between lateral supporting arms with handle caps standing at either end. The token device housing is formed in one piece laterally directly on one side of one of the handle caps and is provided on its opposite side with a receptacle for the correspondingly shortened handle bar.

22 Claims, 5 Drawing Sheets

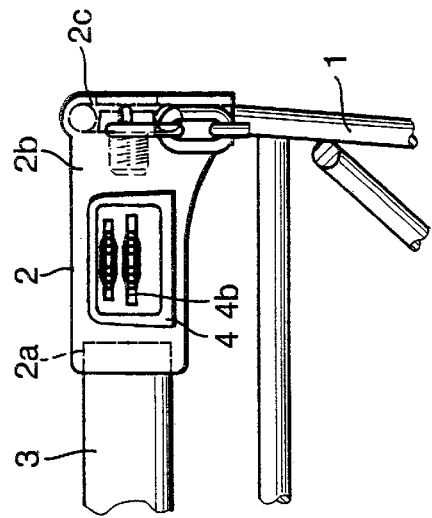
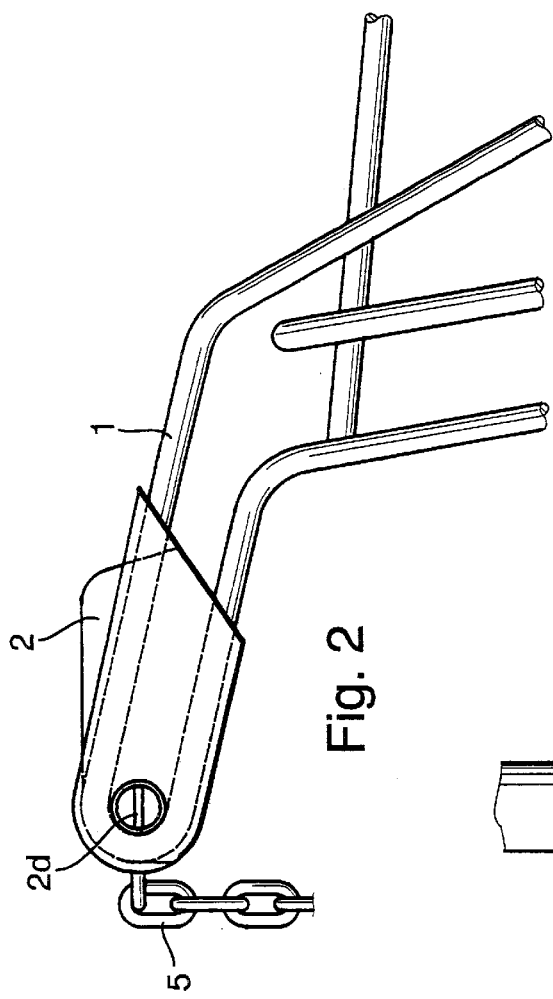
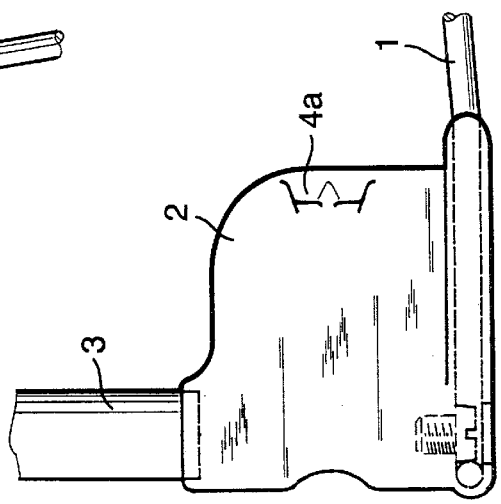
Fig. 1
Fig. 2
Fig. 3

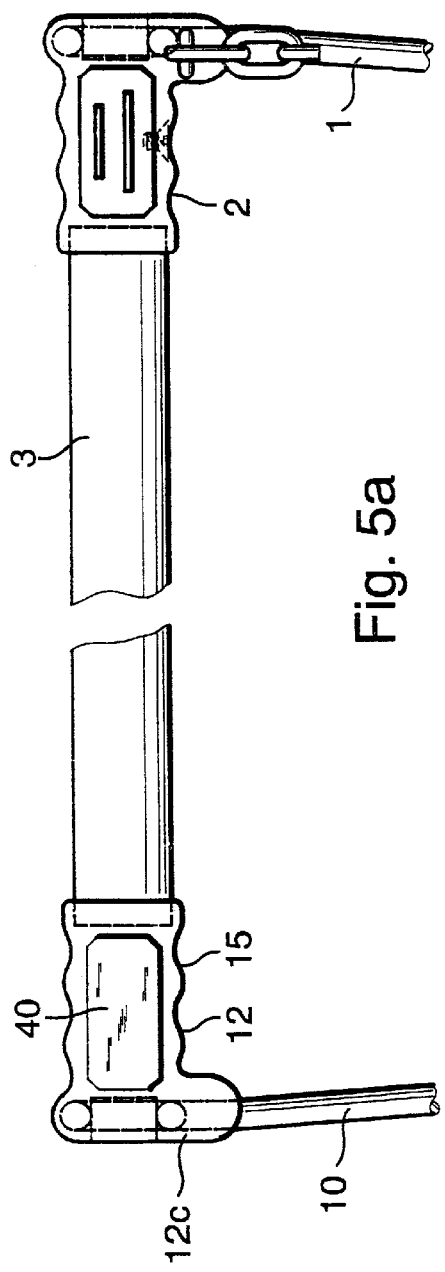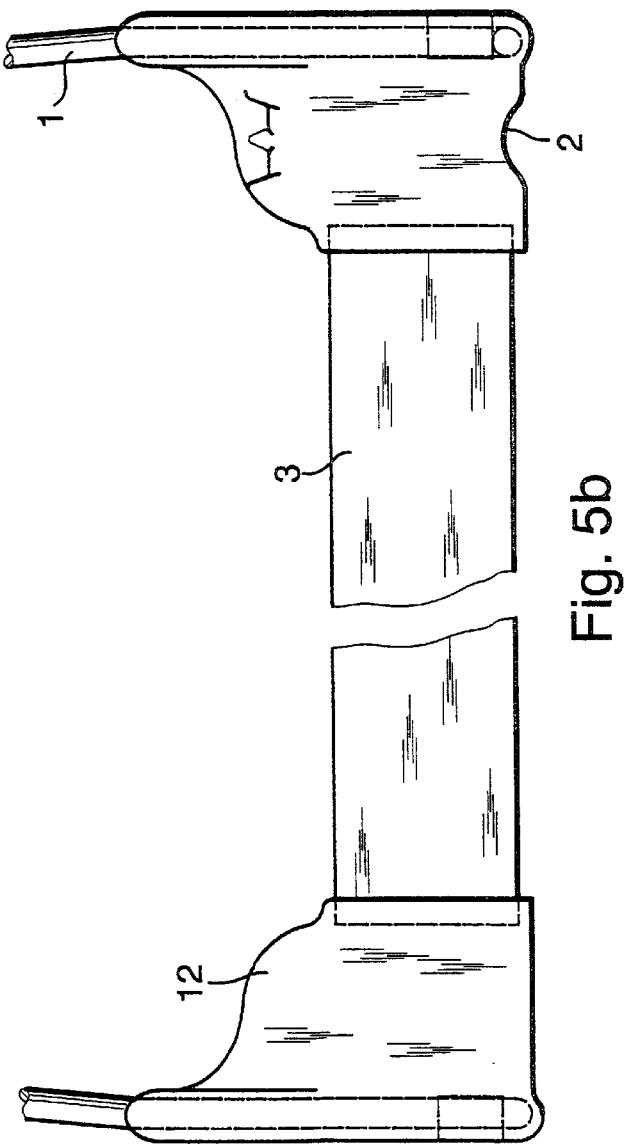

TRANSPORT CART WITH DEPOSIT LOCK

BACKGROUND OF THE INVENTION

The invention concerns a transport cart, especially a shopping cart, which can be pushed into a cart of the same type, which is equipped with a facility for accommodating merchandise, generally in the form of a basket, which has a rearward handle bar extending transversely which is mounted arranged at its ends by means of connection elements on lateral supporting arms, and which serves for moving the cart. The cart has a deposit lock in the handle vicinity and a key for locking to one another carts standing in a parking column or for releasing the cart standing preferably at the end of the column in exchange for inserting a deposit token. The deposit lock secures the deposit token upon release of a cart and releases it when the cart is coupled on again. The deposit lock is arranged between the connection element on the one hand and the correspondingly shortened handle bar on the other.

A transport cart with such a position of the deposit lock is known from German utility model 93 13 499. In this connection, a cylindrical support is installed on each of two opposite sides of the lock housing. The one support is inserted into the handle bar and screwed in there. The other support is inserted into a cylindrical attachment of a handle cap functioning as a connecting element and locked there with the aid of an expansion anchor, whereby the handle cap is also attached on its supporting arm at the same time. The deposit lock is thereby braced on the handle bar as well as secured against rotation on one of the two handle supporting arms. In return, however, the ergonomically beneficial outer handle area near the supporting arm is lost, as becomes clear from FIG. 1 of the utility model. Moreover, the multi-part configuration increases assembly expenditures.

Furthermore, mounting the deposit lock separately from the handle cap above one of the supporting arms is known from European patent No. 508 193. One obtains thereby an absolutely stable arrangement of the lock, secure from rotation in particular. In return, one must, however, install two different parts on the supporting arm mentioned.

Finally, providing the deposit lock housing with a pocket-shaped continuation to be pushed back on the lateral supporting arm and with a cylindrical hub for insertion of the handle bar is known from European published patent application No. 0 199 274. In this way, the deposit lock is braced in a form-locking manner on the supporting arm and on the handle, so that an intentional rotation is ruled out. On the other hand, in this case, the deposit lock projects relatively far upwardly, so that it can be damaged during loading and unloading the cart. Conditions are similar with the European patent No. 518 094.

SUMMARY OF THE INVENTION

Proceeding from this, an object underlying the invention is simplifying the lock assembly of the shopping cart of the type described at the beginning, in which the deposit lock is arranged at the height of the handle bar. Moreover, loading and unloading, as well as pushing of the cart should in no way be impaired by the lock, this rather being optimally integrated into the handle area.

This object is solved by the invention in that the accompanying connection element is extended in the direction of the handle bar at least on one of the two handle supporting arms, and forms a one piece tip-stretched housing for the complete or partial accommodation of the deposit lock, whereby the lock housing is basically held by the connection element and its supporting arm.

In accordance with the invention, the connection element, which has previously functioned only as a handle cap, is thus axially extended for receiving the coin lock, whereby the one piece construction of the connection element with the deposit lock yields a simpler assembly, because only one part must be fastened. Moreover, one obtains an absolutely rotation-proof arrangement by bracing the lock on the connection element, that means in the final analysis on the supporting arm, without impeding loading and unloading. At the same time, the deposit lock lies at least partly at the level of the handle bar, but displaced transversely inward toward the supporting arm, so that the supporting arm does not need to be shortened.

It has proved expedient in a further embodiment of the invention that the connection element transitions into the lock housing without an intermediate piece, especially without a handle bar portion, and is extended beyond this to form a receptacle for the handle bar, whereby it is held by its supporting arm alone. One can thereby construct the plug connection between the shortened handle bar and the side of the lock housing allocated to it without any rotation-proofing and also without a form lock acting in an axial direction, whereby production and assembly costs are further diminished.

The connection element can be constructed as a conventional handle cap, to which the lock housing is joined in a transverse direction. It also lies within the bounds of the invention, however, that the connecting element, when viewed from above is shaped like a quadrant so that it terminates with the one end in the direction of the accompanying handle supporting arm and is there in particular constructed as a plug element, somewhat like a conventional handle cap, while its other end terminates bent about 90° in the direction of the handle bar. The deposit lock is then appropriately accommodated in this bent area.

It is especially favorable if the lock housing is formed in the connection element by a recess on the upper or under side, or by a central hollow space in the connection element, so that the lock is partially or wholly inserted into the connection element. In this regard, the possibility arises of constructing the lock as an interchangeable plug element which can be fixed on or in the lock housing of the connection element. One can thereby use the same connection element for locks with different tokens, thus particularly for different currencies.

Another advantageous further development of the invention consists in that the mentioned recess or hollow space in the connection element can be closed by a closing element instead of the lock. The recess then has a flush closure, so that the same connection element can only be installed with a mirror image construction at the other end of the handle bar. The cart thereby has an absolutely symmetrical appearance, apart from the coin slots and slot for inserting the key. Moreover, the expedient possibility offers itself of distributing the connection piece first without the lock, i.e., only with the closing element, and later after-fitting it with the lock, when needed. The lock can also be installed on the left or the right, as desired.

Various possibilities for anchoring the connection element to the supporting arm can be considered, especially the already-practiced compression joints or expansion joints. The key for coupling to the neighboring cart can be hung on the deposit lock, more expediently however in the area of the connection element.

BRIEF DESCRIPTION OF THE SEVERAL VIEWS OF THE DRAWING

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is a view of one part of the shopping cart from the rear in the direction of movement;

FIG. 2 is a side view of the cart portion of FIG. 1;

FIG. 3 is a top view of the portion of FIG. 1;

FIG. 5a is a rear view and FIG. 5b is a top view of the complete handle bar with two handle caps in accordance with a further embodiment;

FIG. 7a is a rear view of the embodiment in accordance with FIG. 6a; and

DETAILED DESCRIPTION OF THE INVENTION

Figure 4A:
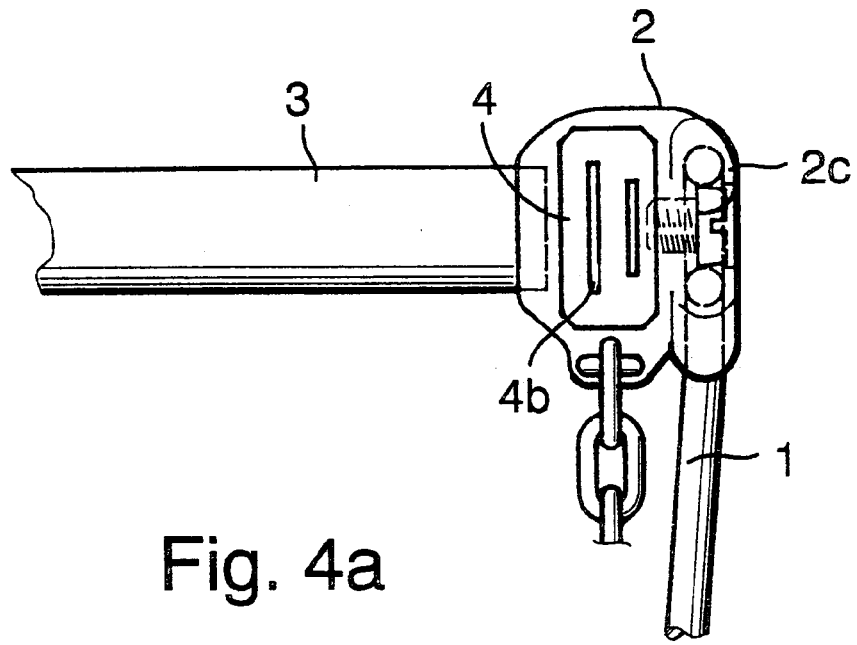
FIG. 4a is a rear view and FIG. 4b is a top view of the same cart portion in accordance with an alternative embodiment.

The present invention is suited for all sorts of transport carts which have a handle bar or the like arranged between lateral support arms for pushing the cart and which are suited for stacking one behind the other on the basis of their shape. A typical embodiment of such a cart is described in European patent No. 508 193. Reference is made to this publication in full to prevent repetitions.

FIGS. 1 to 3 show the rear right corner of such a transport cart in each case, thus that area where the handle supporting arm 1 running laterally obliquely upwardly is connected with the transversely running handle bar 3 by a connection element 2. One recognizes therein that this connection element 2 is constructed in one piece, in which it has a plug connection 2a on its left end for receiving the handle bar 3, is constructed as a lock housing 2b for a token or coin deposit lock 4 in its central area, and transitions into a handle cap 2c on its right end.

The handle cap 2c has the usual form. That means that it encloses pocket-like the two round wires, arranged one above the other and running toward the rear with a slight upward gradient, which comprise the handle supporting arm 1 and which are commonly connected with each other at their rear end by a U-shaped bend. The connection element 2 is lengthened on its side facing the shortened handle bar 3 and in an imaginary extension of the of the handle bar 3 to form the lock housing 2b in such a manner that the lock 4 lies wholly or at least largely at the same height level as the handle bar 3. One thereby obtains an extraordinarily stable, economic, and at the same time compact arrangement of the deposit lock.

The attachment of the connection element 2 to the supporting arm 1 can take place in a manner known per se, thus in particular by means of a face side opening 2d, whose axis passes through the center of the above-mentioned U-shaped bend at the rear end of the handle supporting arm 1. A screw is inserted into this opening and is screwed into a nut, especially in the form of an expansion anchor, positioned in the pocket of the handle cap.

As FIGS. 1 to 3 moreover show, a coupling element, for example a chain 5 with a key not depicted in greater detail, is mounted in the transition area between the handle cap 2c and the lock housing 2b, which serves for attachment to the next transport cart, whereupon its deposit lock releases the token in a manner known per se. For this, each deposit lock 4 has an opening 4a in its forward area relative to the direction of motion, which permits the insertion of the key hanging on the cart standing in front of it.

In the embodiment depicted, the rearwardly oriented insertion slots 4b for the deposit token(s) are horizontally aligned. In this way, the deposit lock 4 is so flat that the lock housing 2b does not project further than the plug connection 2a surrounding the end of the handle bar 3 in directions radially above, behind and below relative to the handle bar 3. The connection element 2 can therefore also serve as a handle in the area where the lock 4 is accommodated. In this way, a handle is available at a far outwardly lying place on the cart, thus at an ergonomically particularly suitable position for guiding the cart. That this handle at the same time contains the deposit lock is in no way disturbing, since it need not project rearward toward the user nor upwardly above the handle.

The deposit lock 4 itself should be constructed as an interchangeable plug element on or in the connection element 2. It therefore requires a suitable shape or hood which transitions over into the surrounding lock housing as flush as possible only on that side which remains visible following installation into the connection element 2. In the embodiment shown, this is the side where the token slot is found. Of course, instead of this, the deposit lock could also be incorporated into the connection element 2 from the other side. Fastening it in the connection element 2 expediently takes place by means of a catch or snap connection. It is also possible, however, to select a form-locking connection, perhaps by screws.

Figure 4B:
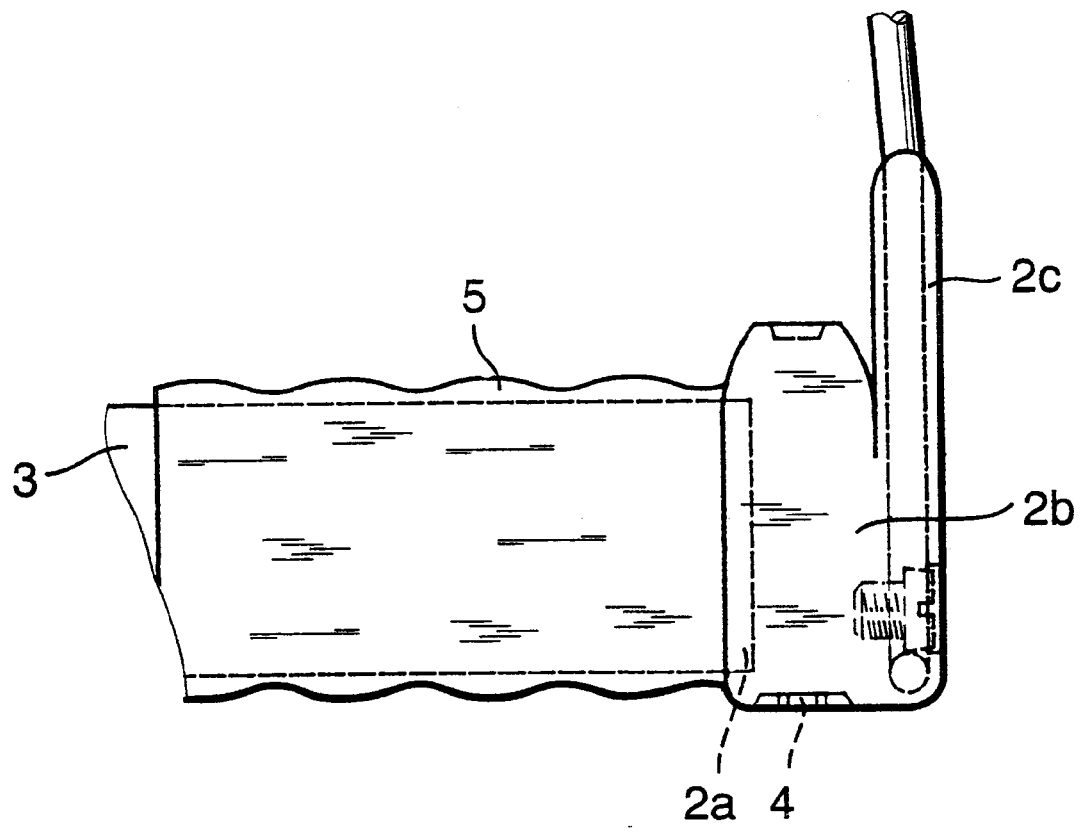

The type of construction in accordance with FIGS. 4a and 4b basically has the same structure, but manages with a smaller construction space in a transverse direction owing to the vertical arrangement of the insertion slots 4b. Moreover, the connection between the deposit lock and the supporting arm is even more stable because forces acting on the deposit lock from the outside have only an extremely short lever arm.

This gain in space offers the additional advantageous possibility of extending the connection element 2 beyond the lock housing in the direction of the handle bar 3 while forming a grip 5 as shown in FIG. 4b. If desired, the handle bar 3 can at the same time be shortened since the receptacle 2a is extended to the free end of the grip 5.

In order that this grip is also available at the opposite end of the handle bar 3, as shown in FIGS. 5a and 5b, the connection element 12, which has a handle cap 12c for mounting on the supporting arm 10, is likewise extended in the direction of the handle bar 3 while forming a grip 15. In this grip 15, a closing element 40 is provided in place of the deposit lock in the corresponding connection element 2 at the other end of the handle bar. One thereby obtains at the same time a largely symmetrical appearance at both ends of the handle bar.

Figure 6A:
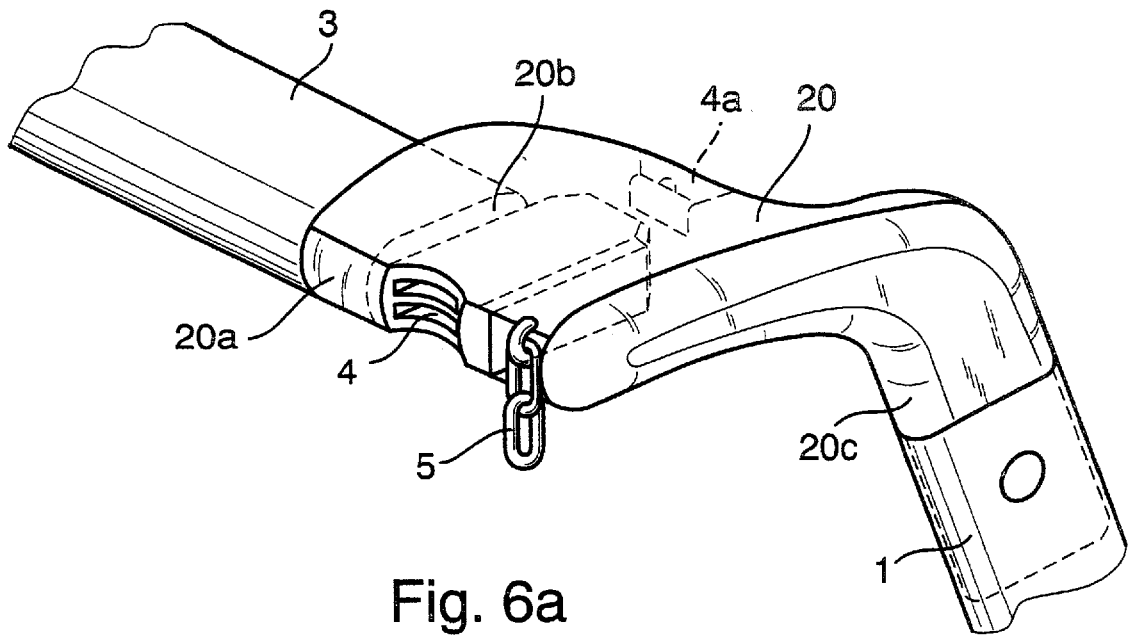
FIG. 6a is an oblique view of a connection element in accordance with a third embodiment.

FIG. 6a shows a differently shaped connection element 20. It basically has the shape of a handle which is mounted with its one end 20c on the supporting arm 1, which is here constructed as a single tube. The connection element 20 undergoes a further bend after bending toward the horizontal, and to be sure a 90° bend in the transverse direction, so that the handle end 20b there transitions over into the handle bar 3, to be sure by means of a receptacle 20a.

As the drawing moreover shows, the last-mentioned end 20b of the connection element 20 also functions as a lock housing for accommodating the lock 4 which is constructed as a plug element which can be horizontally inserted and fixed in the connection element 20, as in FIGS. 1 to 3. The other end of the lock can project to the rear side of FIG. 6a, thus in the direction of travel, opposite the otherwise tube-shaped connection element 20, so that the insertion slot 4a is easily accessible there for inserting the key when reattaching the cart. This projecting area is so shaped that it is likewise available as a handle for pushing the cart. The chain 5 with the key for coupling to the following cart is mounted in the middle area of the connection element 20, suitably laterally alongside the deposit lock 4.

Figure 7A:
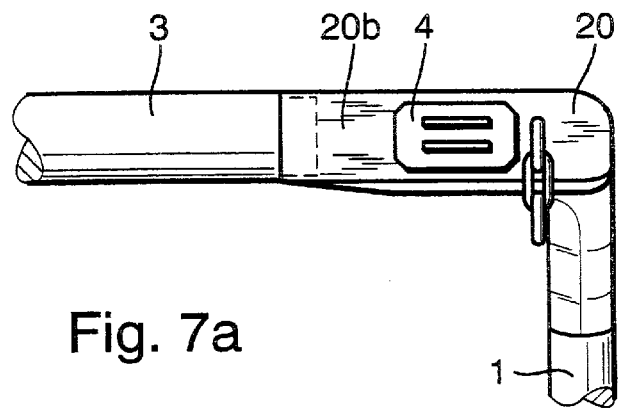
Figure 7B:
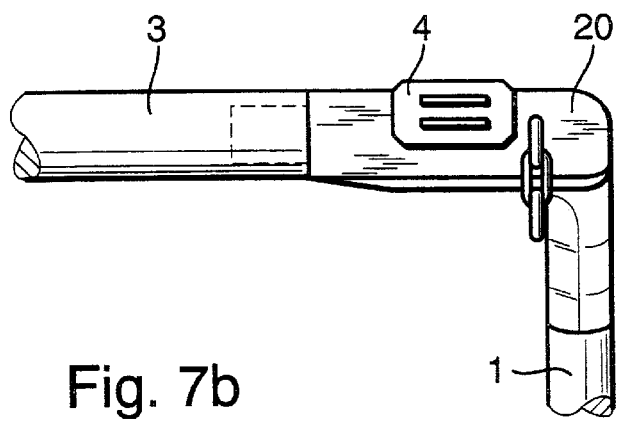
FIGS. 7b and 7c are similar rear views in connection with other positions of the deposit lock.
Figure 7C:
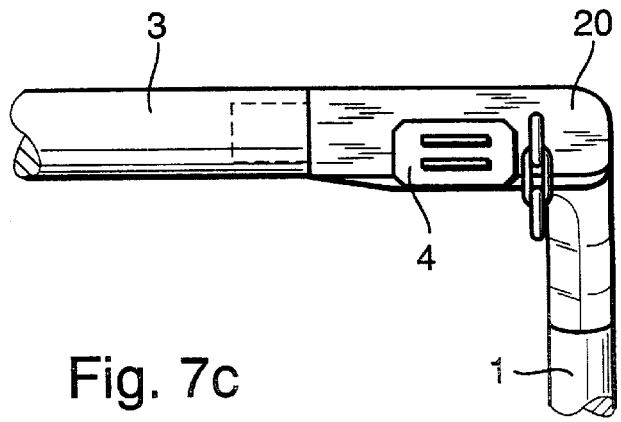

FIG. 7a shows a horizontal rear view of the transition area between the supporting arm 1 and the handle bar 3 represented in FIG. 6a. The deposit lock 4 lies here at the same height level as the handle bar and is surrounded on both sides, both above and below, by the area 20b of the connection element 20 which functions as the lock housing. FIGS. 7b and 7c show the same back view. However, the deposit lock is not completely incorporated into the connection element 20 here, but projects somewhat downward or upward.

All Figures proceed from the assumption that the handle bar 3 is fixedly connected with at least one of the two supporting arms. When the handle bar 3 has an oval cross section, it can, however, also be expedient to provide a pivot bearing between the handle bar and the two adjacent connection elements, which permits arresting the handle bar 3 in various rotational positions. In this way, the handle bar can always be adjusted to the most ergonomically suitable position, independently of the inclination of the supporting arm 1, which varies from cart type to cart type.

Instead, it is also possible (chiefly in connection with handle tubes with a round cross section) to construct the handle tube in one piece with the two connection elements 2 or 20, so that one has only a single part to be mounted on the two supporting arms.

Figure 6B:
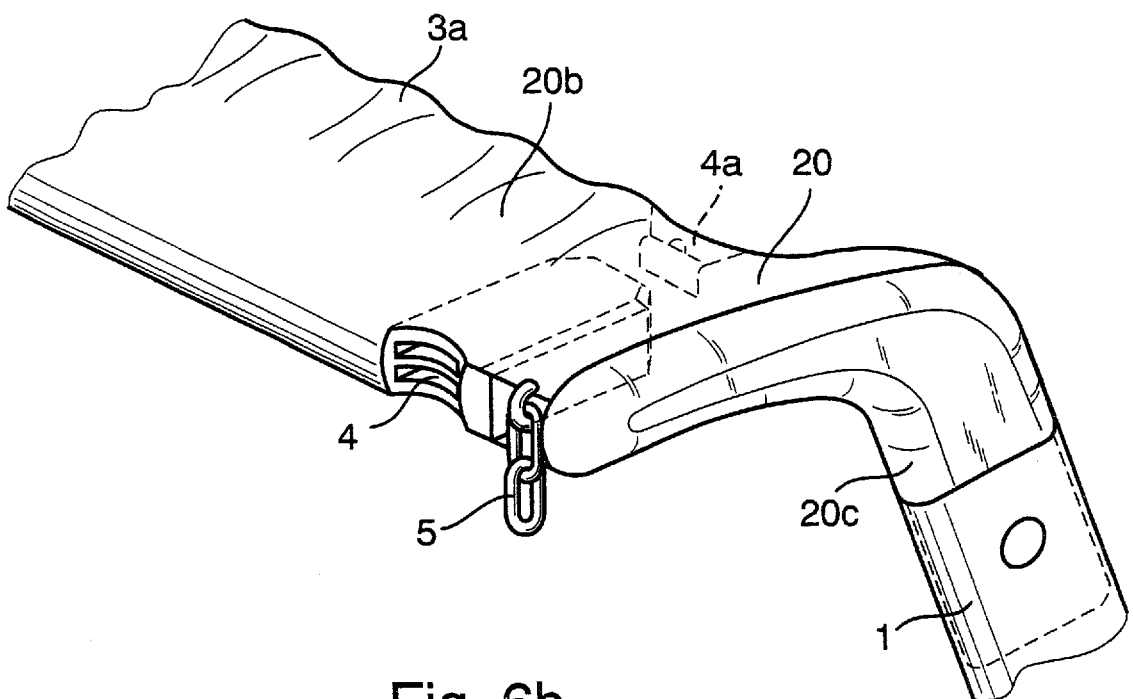
FIG. 6b is an oblique view of a connection element in accordance with a fourth embodiment.

Furthermore, according to FIG. 6b, it lies within the bounds of the invention to dispense with the continuous handle tube 3, and instead to fashion one handle stump 3a on each side of the cart on the respective connection element 2. These handle stumps can be directly constructed as lock housings, in particular thus having a recess in which the lock is inserted as a plug element, or which in the case of the handle stump on the other side is closed by a closing element. The receptacle 20a for the handle tube 3 is absent in this case.

In so far as deposit tokens have been discussed above, these include data carriers or punched cards in addition to value marks, coins or the like. In the case of data carriers or punched cards, it lies within the bounds of the invention to supplement the deposit lock with an automatic deduction machine.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A transport cart which can be pushed into a cart of a similar type, comprising a facility suitable for receiving objects, a handlebar (3) for moving the cart extending traversely across a rear end of the cart, said handlebar (3) being mounted at its ends on lateral supporting arms (1) by at least one connection element (2), a deposit lock (4) adjacent to the handlebar (3), and a key (5) for locking together carts standing in a parking column or for releasing a cart in exchange for inserting a deposit token, whereby the deposit lock (4) bars the deposit token upon releasing the cart and releases the token when the cart is reconnected, the deposit lock (4) being arranged in a first connection element (2) between one of the supporting arms (1) and the handlebar (3), wherein the first connection element (2, 20) is lengthened on an end toward the handlebar (3) and the handlebar is correspondingly shortened, and the lengthened first connection element forms a lock housing (2b, 20b) constructed in one piece for at least partial accommodation of the deposit lock (4), whereby the lock housing (2b, 20b) is essentially held by the first connection element (2, 20) and its supporting arm (1), at least the first connection element (2, 20) terminates at one end (20c) in a direction of the supporting arm (1) and terminates at another end (20a) facing in a direction of the handlebar (3).

2. The transport car according to claim 1, wherein the cart is a shopping cart and the receiving facility comprises a basket for receiving merchandise.

3. The transport cart according to claim 1, wherein the first connection element (2, 20) has a receptacle (2a, 20a) for the handle bar (3) in a further extension of the first connection element.

4. The transport cart according to claim 1, wherein the lock housing (2b) is held alone by the first connection element (2) and its supporting arm (1).

5. The transport cart according to claim 1, wherein the lock housing (2b, 20b) is formed by a recess in the first connection element (2, 20).

6. The transport cart according to claim 5, wherein on an opposite end of the handle bar (3) a corresponding recess in a second connection element (2, 20) is closed by a closure element (40) instead of the lock (4).

7. The transport cart according to claim 1, wherein the lock (4) is constructed as an interchangeable plug element which can be fixed in the lock housing (2b, 20b).

8. The transport cart according to claim 1, wherein the lock housing (2b, 20b) is shaped as a handgrip.

9. The transport cart according to claim 1, wherein at least a side of the lock (4) provided with a token slot (4b) is connected flush with the lock housing (2b, 20b).

10. The transport cart according to claim 1, wherein the handle bar (3) is mounted so that it can be rotated about its axis and be stopped in various rotational positions on its at least one connection element (2, 20).

11. The transport cart according to claim 1, wherein the handle bar (3) is joined in one piece with the at least one connection element (2).

12. The transport car according to the claim 11, wherein the handle bar (3) is continuous and joined in one piece with a connection element (2) at each end.

13. The transport cart according to claim 1, wherein the at least one connection element (2, 20) is extended beyond the lock housing (2b, 20b) in a direction of the handle bar (3) while forming a grip (5) approximately coaxially to the handle bar.

14. The transport cart according to claim 1, wherein a second connection element (12) is constructed as a mirror image to the at least one connection element (2, 20), is mounted on a second supporting arm (10) and is likewise extended as one piece in a direction of the handle bar (3).

15. The transport cart according to claim 14 wherein the second connection element (12) has at least one closure (40) in its lock housing instead of the deposit lock (4).

16. The transport cart according to claim 1, wherein the handle bar (3) is constructed as a separate handle stump (3a) on each of two connection elements (2, 20).

17. The transport cart according to claim 16, wherein the handle stump (3a) of one of the connection elements contains the lock housing (20b).

18. A transport cart which can be pushed into a cart of a similar type, comprising a facility suitable for receiving objects, a handlebar (3) for moving the cart extending traversely across a rear end of the cart, said handlebar (3) being mounted at its ends on lateral supporting arms (1) by at least one connection element (2), a deposit lock (4) adjacent to the handlebar (3), and a key (5) for locking together carts standing in a parking column or for releasing a cart in exchange for inserting a deposit token, whereby the deposit lock (4) bars the deposit token upon releasing the cart and releases the token when the cart is reconnected, the deposit lock (4) being arranged in a first connection element (2) between one of the supporting arms (1) and the handlebar (3), wherein the first connection element (2, 20) is lengthened on an end toward the handlebar (3) and the handlebar is correspondingly shortened, and the lengthened first connection element includes a recess defining a lock housing (2b, 20b) constructed in one piece for at least partial accommodation of the deposit lock (4), on an opposite end of the handle bar (3) a corresponding recess in a second connection element (2,20) is closed by a closure element (40) instead of the lock (4), whereby the lock housing (2b, 20b) is essentially held by the first connection element (2, 20) and its supporting arm (1).

19. A transport cart which can be pushed into a cart of a similar type, comprising a facility suitable for receiving objects, a handlebar (3) for moving the cart extending traversely across a rear end of the cart, said handlebar (3) being mounted at its ends on lateral supporting arms (1) by at least one connection element (2), a deposit lock (4) adjacent to the handlebar (3), and a key (5) for locking together carts standing in a parking column or for releasing a cart in exchange for inserting a deposit token, whereby the deposit lock (4) bars the deposit token upon releasing the cart and releases the token when the cart is reconnected, the deposit lock (4) being arranged in a first connection element (2) between one of the supporting arms (1) and the handlebar (3), wherein the first connection element (2, 20) is lengthened on an end toward the handlebar (3) and the handlebar is correspondingly shortened, and the lengthened first connection element forms a lock housing (2b, 20b) constructed in one piece for at least partial accommodation of the deposit lock (4), the deposit lock (4) is constructed as an interchangeable plug element and can be fixed in the lock housing (2b, 20b) whereby the lock housing (2b, 20b) is essentially held by the first connection element (2, 20) and its supporting arm (1).

20. A transport cart which can be pushed into a cart of a similar type, comprising a facility suitable for receiving objects, a handlebar (3) for moving the cart extending traversely across a rear end of the cart, said handlebar (3) being mounted at its ends on lateral supporting arms (1) with a connection element (2) at each end, the handlebar (3) being continuous and joined as one piece with the connection elements at each end, a deposit lock (4) adjacent to the handlebar (3), and a key (5) for locking together carts standing in a parking column or for releasing a cart in exchange for inserting a deposit token, whereby the deposit lock (4) bars the deposit token upon releasing the cart and releases the token when the cart is reconnected, the deposit lock (4) being arranged in a first connection element (2) between one of the supporting arms (1) and the handlebar (3), wherein the first connection element (2, 20) is lengthened on an end toward the handlebar (3) and the handlebar is correspondingly shortened, and the lengthened first connection element forms a lock housing (2b, 20b) constructed in one piece for at least partial accommodation of the deposit lock (4), whereby the lock housing (2b, 20b) is essentially held by the first connection element (2, 20) and its supporting arm (1).

21. A transport cart which can be pushed into a cart of a similar type, comprising a facility suitable for receiving objects, a handlebar (3) for moving the cart extending traversely across a rear end of the cart, said handlebar (3) being mounted at its ends on lateral supporting arms (1) by a first connection element (2), a deposit lock (4) adjacent to the handlebar (3), and a key (5) for locking together carts standing in a parking column or for releasing a cart in exchange for inserting a deposit token, whereby the deposit lock (4) bars the deposit token upon releasing the cart and releases the token when the cart is reconnected, the deposit lock (4) being arranged in the first connection element (2) between one of the supporting arms (1) and the handlebar (3), wherein the first connection element (2, 20) is lengthened on an end toward the handlebar (3) and the handlebar is correspondingly shortened, and the lengthened first connection element forms a lock housing (2b, 20b) constructed in one piece for at least partial accommodation of the deposit lock (4), a second connection element (12) constructed as a mirror image to the first connection element (2,20) and being mounted on a second supporting arm (10) and extends as one piece in a direction of the handle bar (3) and has at least one closure (40) in its lock housing instead of the deposit lock (4) whereby the lock housing (2b, 20b) is essentially held by the first connection element (2, 20) and its supporting arm (1).

22. A transport cart which can be pushed into a cart of a similar type, comprising a facility suitable for receiving objects, a handlebar (3) for moving the cart extending traversely across a rear end of the cart, said handlebar (3) being constructed as a separate handle stump (3a), the separate stumps mounted on lateral supporting arms (1) on each of two connection elements (2), a deposit lock (4) adjacent to the handlebar (3), and a key (5) for locking together carts standing in a parking column or for releasing a cart in exchange for inserting a deposit token, whereby the deposit lock (4) bars the deposit token upon releasing the cart and releases the token when the cart is reconnected, the deposit lock (4) being arranged in a first connection element (2) between one of the supporting arms (1) and the handlebar (3), wherein the first connection element (2, 20) is lengthened on an end toward the handlebar (3) and the handlebar is correspondingly shortened, and the lengthened first connection element forms a lock housing (2b, 20b) constructed in one piece for at least partial accommodation of the deposit lock (4), whereby the lock housing (2b, 20b) is essentially held by the first connection element (2, 20) and its supporting arm (1).

* * * * *